Sept. 15, 1925.
M. SKLOVSKY
1,553,334
FOUNDRY TRUCK
Filed April 14, 1923
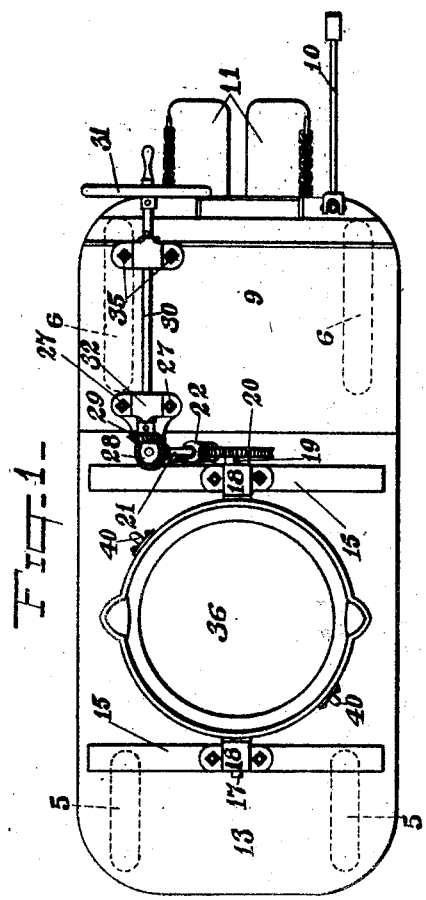
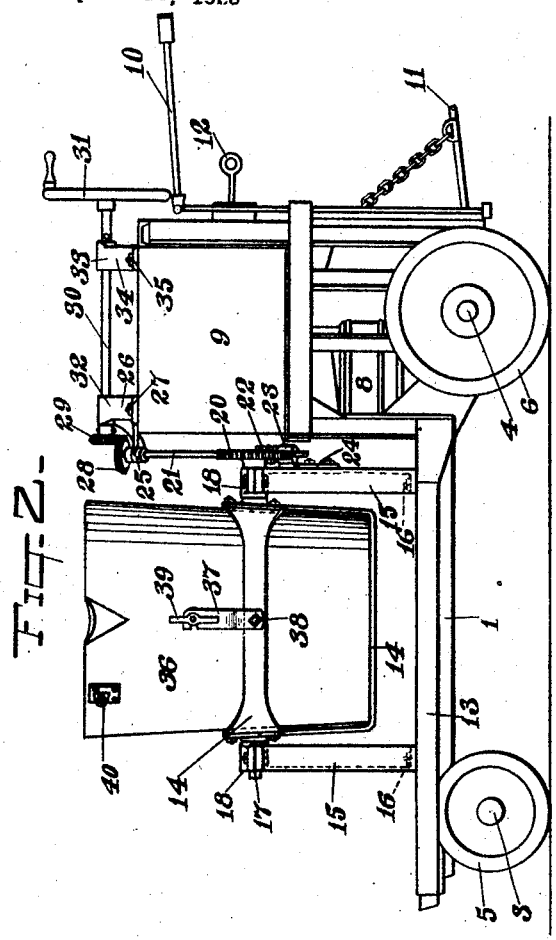
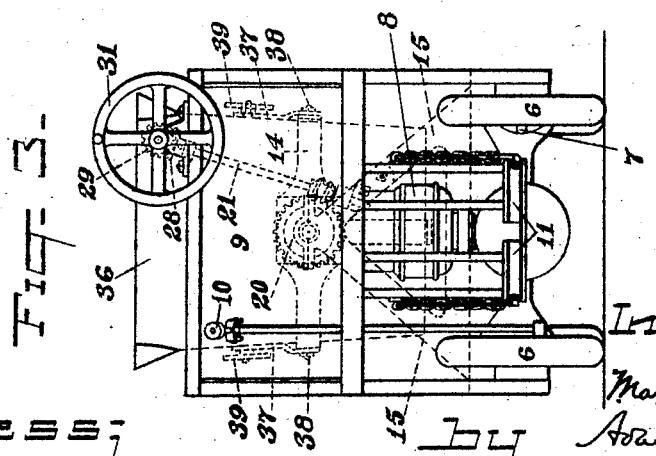

Patented Sept. 15, 1925.

1,553,334

UNITED STATES PATENT OFFICE.

MAX SKLOVSKY, OF MOLINE, ILLINOIS, ASSIGNOR TO DEERE & COMPANY, OF MOLINE, ILLINOIS, A CORPORATION OF ILLINOIS.

FOUNDRY TRUCK.

Application filed April 14, 1923. Serial No. 632,169.

*To all whom it may concern:*

Be it known that I, MAX SKLOVSKY, a citizen of the United States, residing at Moline, in the county of Rock Island and State of Illinois, have invented certain new and useful Improvements in Foundry Trucks, of which the following is a specification, reference being had therein to the accompanying drawing.

This invention relates to an attachment for industrial trucks and it is an object of the invention to adapt such trucks for use in foundries whereby they will be adapted to transport molten metal from the cupola to various parts of the foundry to supply the floor ladles. These floor ladles are necessarily limited in size and capacity and this attachment is of relatively large capacity so that a number of floor ladles may be supplied with a great saving in time and labor. Another object of the invention is to provide a molten metal carrier that can be quickly, easily and safely handled and permits the transportation of molten metal to any desired location in the foundry without the use of the tracks or overhead trolleys commonly used. A further object of the invention is to provide the metal container with a positively operating tilting control so positioned that the operator of the truck can also operate the metal container without leaving his position on the truck. By so arranging the tilting control, the truck operator can maneuver the truck so that the metal may be delivered from the truck at the desired point without the necessity of leaving his position.

Referring to the drawings in which like numerals indicate identical parts:

Figure 1 is a top plan view of an industrial truck with the molten metal carrying attachment in place.

Figure 2 is a side view of Figure 1.

Figure 3 is a rear elevation of Figure 1.

The industrial truck illustrated is of a well known type and construction in which the motive power consists of a storage battery and electric motor and allied mechanism. It is thought not necessary to show and describe the truck and driving mechanism in detail as such forms no part of the present invention. In general, the truck consists of a frame 1, axles 3 and 4, upon which are mounted supporting wheels 5 and 6 respectively. The wheels 6 are driven through driving shafts 7 connected with a motor 8 by means of suitable gearing, not shown. The motor 8 receives current from storage batteries contained in case 9. The driven wheels 6 are dirigible and are controlled by means of a steering lever, indicated at 10, which is located in a position convenient to the operator who, when operating the truck, stands on a suitable support or platform, which in the truck illustrated is composed of footboards 11. By means of a switch 12, the operator controls the flow of current from the batteries in the case 9 to the motor 8. The truck is also provided with a relatively low platform 13 upon which I mount a ladle cradle 14 swingingly mounted in supports 15, which are securely fastened to the platform 13 by means of bolts 16. The cradle 14, as before stated, is swingingly mounted on the supports 15 by means of trunnions 17 mounted in suitable bearings 18 in the upper ends of the supports 15. One of the trunnions 17 extends beyond its bearing 18 a sufficient distance to permit securing to it, in this case by means of a pin 19, a worm gear 20. Secured to an upwardly extending shaft 21 is a worm 22, which meshes with the worm gear 20. The shaft 21 is mounted at its lower end in a bearing 23 in a bracket 24 secured to the support 15; and at its upper end in a bearing 25 in an arm of a bracket 26 secured to the top of the case 9 by means of bolts 27. The shaft 21 extends through the bearing 25 and on this extension is secured a bevel gear 28. A bevel gear 29, meshing with the gear 28 is secured on the forward end of a shaft 30 which extends rearwardly and has secured on its rearward end a hand wheel 31 within convenient reach of the operator. The shaft 30 is supported near its forward end in a bearing 32 in the bracket 26 and near its rearward end in a bearing 33 in a bracket 34 secured to the case 9 by bolts 35.

A ladle 36 is carried in the cradle 14 and is held in position by means of hooks 37, pivotally attached to the cradle by means of bolts 38, engaging suitable lugs 39 secured to the ladle 36. The ladle 36 is also provided with lugs 40 having suitable apertures for the reception of the hooks or chains of a hoist when its is desired to remove the ladle from its cradle on the truck, at which time the hooks 37 are freed from engagement with the lugs 39.

The operation is as follows:

A ladle of molten metal is placed in the cradle, usually by means of a suitable hoist, and is locked in position by means of the hooks 37. The operator, standing on the footboards 11, runs the truck to the portion of the foundry where it is desired to deliver the molten metal, controlling the direction of the truck through the steering lever 10 and its speed by means of the switch 12. After stopping the truck in the desired location, the operator turns the handwheel 31 which, through the previously described gearing, will tilt the cradle, allowing the molten metal to flow out. The worm gear 20 and worm 22 are of the non-coasting type and, consequently, the cradle will stay in any desired position to which it is tilted through the operation of the handwheel 31. By mounting the cradle controlling means within convenient reach of the truck operator, it is possible for him to perform his duties of driving the truck and controlling the ladle without leaving his position.

While I have shown my invention attached to an electrically driven truck of a well known kind it is to be understood any other suitable truck or motive power, such as a gasoline engine, may be used.

What I claim is—

1. The combination with a motor driven truck comprising a frame, dirigible and propelling wheels, steering means, and a speed regulating mechanism under control of an operator, of a ladle swingingly mounted on the frame and means under control of the operator for swinging the ladle.

2. The combination with a motor driven truck comprising a frame, dirigible and propelling wheels, steering means and a speed regulating mechanism under control of an operator, of a cradle swingingly mounted on the frame and adapted to support a removable ladle, and means under control of the operator for swinging the cradle.

3. The combination with a motor driven industrial truck comprising a frame, dirigible and propelling wheels, an operator's support, steering means, and speed regulating means in convenient reach of an operator when on said support, of a swinging ladle mounted on the frame, and means operatively connected with the ladle and extending to a position adjacent the truck operator's position when on the truck for swinging the ladle under the control of the truck operator.

4. The combination with a motor driven industrial truck comprising a frame, dirigible and propelling wheels, means at one end of the truck for supporting an operator, steering means, and speed regulating means in convenient reach of the operator when on said supporting means, of supports secured on the frame, a cradle swingingly mounted on said supports, and means, positioned near and under control of the truck operator, operatively connected with the cradle for swinging the cradle on its supports.

MAX SKLOVSKY.